United States Patent [19]

Bower

[11] Patent Number: 6,113,956
[45] Date of Patent: Sep. 5, 2000

[54] FOOD PREPARATION METHOD

[75] Inventor: Ronald Bower, Northgate, Australia

[73] Assignee: Conbis Pty Ltd., Queensland, Australia

[21] Appl. No.: 08/973,333

[22] PCT Filed: Jun. 11, 1996

[86] PCT No.: PCT/AU96/00350

§ 371 Date: Dec. 4, 1997

§ 102(e) Date: Dec. 4, 1997

[87] PCT Pub. No.: WO96/41538

PCT Pub. Date: Dec. 27, 1996

[30] Foreign Application Priority Data

Jun. 8, 1995 [AU] Australia ................... PN3444

[51] Int. Cl.[7] ............................................. A21D 13/00
[52] U.S. Cl. ........................ 426/94; 426/19; 426/61; 426/62; 426/104; 426/549
[58] Field of Search .................... 426/94, 549, 61, 426/62, 19, 104

[56] References Cited

FOREIGN PATENT DOCUMENTS 265 786 A1  3/1989  Germany .
1 519 387  7/1978  United Kingdom .

OTHER PUBLICATIONS

Derwent Publications; 76–59137X, Class D11, JP, 60/22065 A (Meiji Milk Product Co. Ltd); Jul. 7, 1976.

Primary Examiner—Lien Tran
Attorney, Agent, or Firm—Merchant & Gould P.C.

[57] ABSTRACT

A food preparation method for teething rusks (200) includes the steps of mixing flour (10), yeast (11) and water (12) in a mixer (13) to form a "well-developed" dough (100). The dough (100) passes through a kneading machine (14) sheeting machine (15) and is allowed to "rest" on a resting conveyor (16). A cutting machine (17) cuts the dough (100) into strips (101) and the fingers of dough (102), the fingers (102) being proved in a prover (18) before being at least partially baked in an oven (19). The baked rusks (200) are conditioned under controlled heat and humidity conditions in a conditioner (20) before being allowed to cool in the packing room (21) and packed in packaging machine (22) for distribution and sale.

11 Claims, 6 Drawing Sheets

FOOD PREPARATION METHOD

This application is a 371 filing of PCT/AU96/00350 filed Jun. 11, 1996.

BACKGROUND OF THE INVENTION

THIS INVENTION relates to a food preparation method.

The invention is particularly suitable for, but not limited to, the preparation of teething rusks for infants.

SUMMARY OF THE INVENTION

Teething rusks appear to be a simple bakery product but, in reality, must satisfy a number of important criteria.

Of these, the most important is that the rusk will not shatter into small pieces which could easily choke a child.

A baby must be able to bite into and indent the rusk without pieces breaking off. Where the rusk can be bitten, eg., by an adult the break line must be 'clean'. The rusk must have a good texture and be low in salt and no added sugar.

It is an object of the present invention to provide a food preparation method, suitable for teething rusks, which enable at least some of the above criteria to be met.

It is a preferred object of the present invention to provide a method which enables high productivity rates to be met.

Other preferred objects of the present invention will become apparent from the following description.

In one aspect, the present invention resides in a food preparation method (suitable for the batch preparation of teething rusks) including the steps of:

a) mixing flour, yeast, water (and optional ingredients) to form a dough;

b) cutting the dough into strips;

c) proving the dough strips under controlled conditions;

d) baking the dough strips to form respective baked products;

e) conditioning the baked products under controlled heat and humidity conditions, the relative humidity being decreased in a plurality of steps; and f) allowing the baked products to cool under controlled humidity conditions.

Preferably, after mixing the dough, the dough is at least lightly kneaded and formed into an elongate sheet or "mat" from which the strips are to be cut. Preferably, the dough is "rested" between the kneading and cutting steps.

Preferably, the dough is mixed under controlled time and temperature conditions to form a "well developed" dough.

Preferably, the dough strips are proved so that the carbon dioxide generated by the yeast forms fine, evenly distributed holes within the dough.

Preferably, the baked products are dried and cooled for one to two days under controlled heat and humidity conditions prior to packing.

In a second aspect, the present invention resides in a food preparation method, as hereinbefore described, where the yeast (as a leavening agent) is omitted.

In a third aspect, the present invention resides in a pair of food preparation rollers to form a sheet of dough into a plurality of strips, wherein:

the rollers are rotatable about spaced, parallel, rotational axes;

each roller has a body with a plurality of circumferential grooves, each pair of grooves being separated by a circumferential flange or land; and the grooves and lands on one of the rollers is aligned with the respective grooves and lands on the other of the rollers.

Preferably, no clearance is provided between the adjacent lands of the rollers.

Preferably, the grooves are defined by substantially planar side walls interconnected by a substantially planar floor, where the shoulders connecting the side walls to the floor are concavely curved.

Preferably, the pair of rollers are driven at identical rotational speeds.

BRIEF DESCRIPTION OF THE DRAWINGS

To enable the invention to be fully understood, preferred embodiments will now be described with reference to the accompanying drawings, in which.

DETAILED DESCRIPTION OF THE PREFERRED EMBODIMENTS

Figure 1:
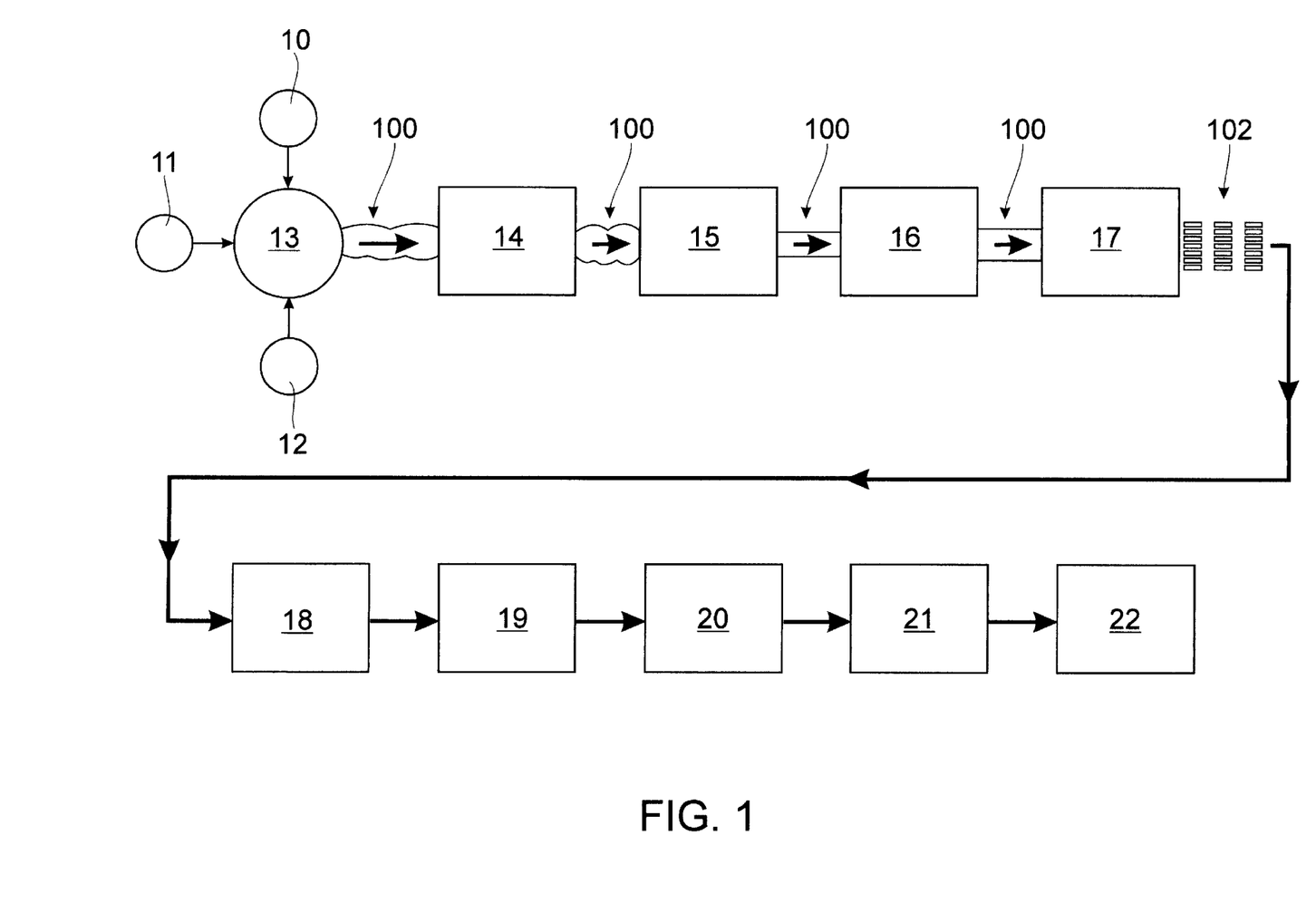
FIG. 1 is a schematic diagram showing the steps of the method.

Flour 10, yeast 11 and water 12 are mixed in a mixer 13 to produce a "well-developed" dough.

Preferably, the flour 10 is selected for its extensibility and balance and low salt content.

A suitable flour includes a combination of wheat flour, wheat germ and malt flour with an extensibility of 25–30 cm at 45 minutes; a resistance of 400–600 B.U.; and a balance of 12.5–17.5.

Preferably, the flour has a water absorption of 60–68% and a salt content of less than 1% (w/w).

In the spiral mixer 13, the dough is mixed for, eg., 10–16 minutes at a preferably slow/fast/slow cycle, to a temperature range of 32–38° C.

The yeast content is selected to provide sufficient carbon dioxide as a leavening agent to enable the dough to be baked as a shaped product.

The dough 100 is transferred from the mixer to a kneading machine 14 where it is lightly kneaded and then rolled in a sheeting machine 15 into a sheet or mat of predetermined width and then allowed to "rest" as it is transported along a conveyor 16. (The "kneading" and "sheeting" functions can be effected in a single "dough sheeting" machine.)

Figure 2:
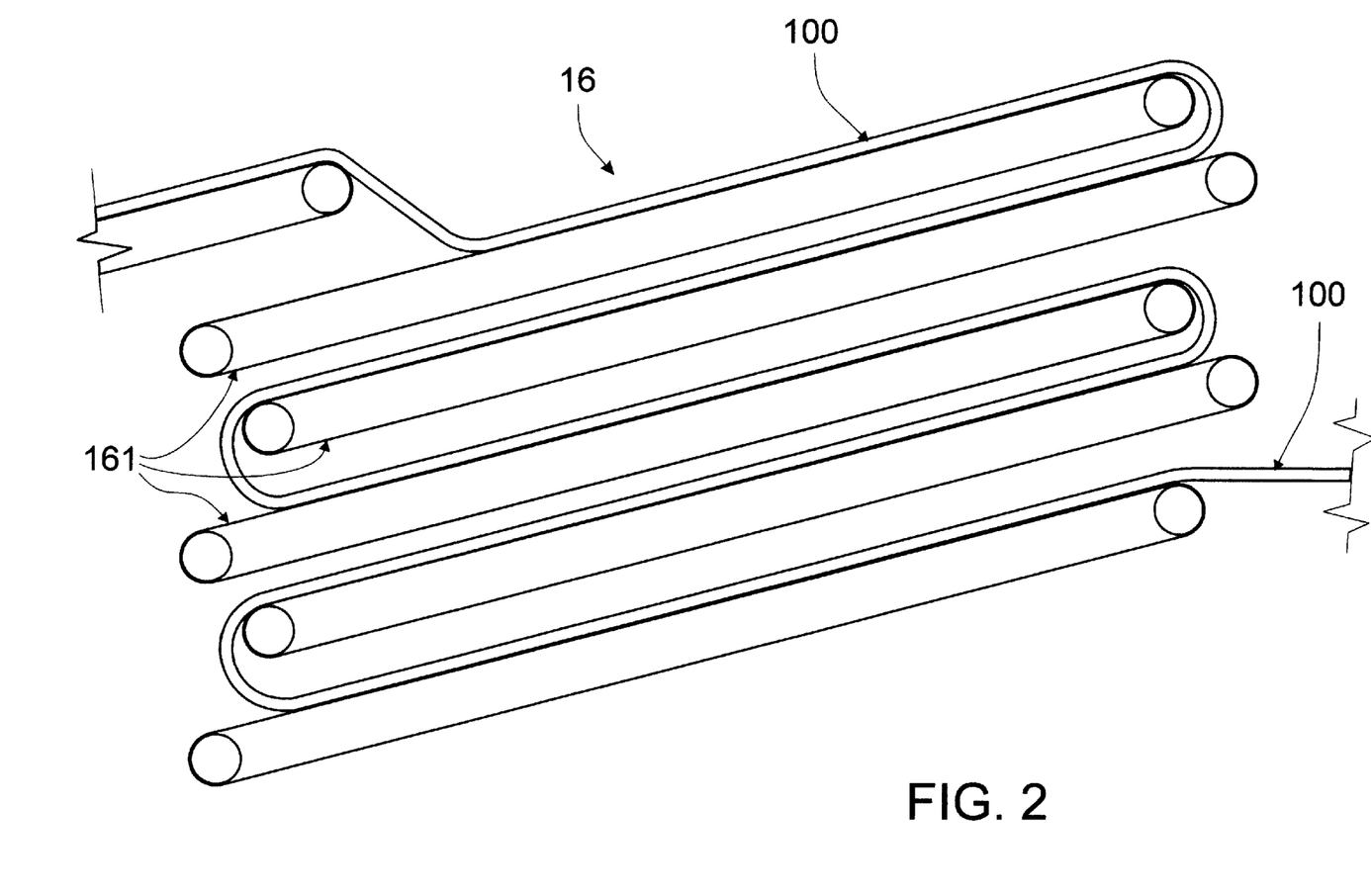
FIG. 2 is a schematic side view of the resting conveyor.

To save floor space, the "resting conveyor" 16 (see FIG. 2) has a series of belts 161 which convey the mat of dough along a serpentine path (eg., for 15–20 minutes).

The dough is transported to a cutting machine 17 (see FIG. 3) which cuts the dough into strips 101 and then cuts the strips to a length into "fingers" 102 of dough.

The dough fingers are placed on trays which are placed in a prover 18 containing moist steam (with a relative humidity of approximately 80%–95%, more preferably 90%) at atmospheric pressure and the fingers are proved for 35–60 minutes. NB: The actual time will be dependent on the yeast level and dough temperature.

The dough fingers must be accurately proved because if they are under-proved, the baking will cause the yeast to release carbon dioxide too fast and the fingers will split; while if the fingers are over-proved, the holes formed by the carbon dioxide in the dough will be too large and the fingers will be fragile.

Once proved, the fingers 102 are at least partially baked in an oven 19 under preselected temperature and time conditions.

For example, in a "dry" oven, the fingers may be baked for 40–50 minutes at 170–180° C.; while in an oven containing steam, the fingers may be baked at 120–130° C. for 35–40 minutes.

The baked fingers, which now have the appearance of the rusk 200, are transferred to a conditioner 20 where the rusks are conditioned under controlled heat and humidity conditions for, eg., 15–24 hours.

As an example, the rusks are initially conditioned at a high relative humidity, eg., 80–90%, at 34–37°, for 4–8 hours; at a lower relative humidity, eg., 70–75% at 34–37° for 7–10 hours; and a lower relative humidity, eg., 65–70% at the above temperature for 4–6 hours.

The conditioned rusks are then allowed to cool, eg., in the packing room 21 in relative dry cool air, eg., having a relative humidity of 45–55% and at, eg., 21–25° C.

The rusks 200 are cooled for 1–2 days before being packed in a packaging machine 22 for distribution to customers.

The actual mixing, proving, baking, conditioning and cooling conditions will all be dependent, inter alia, on the flour and yeast used. The resultant rusks should have a relatively smooth outer texture and an even inner texture of fine similar sized holes or cavities created by the carbon dioxide generated by the yeast 11.

Figure 3:
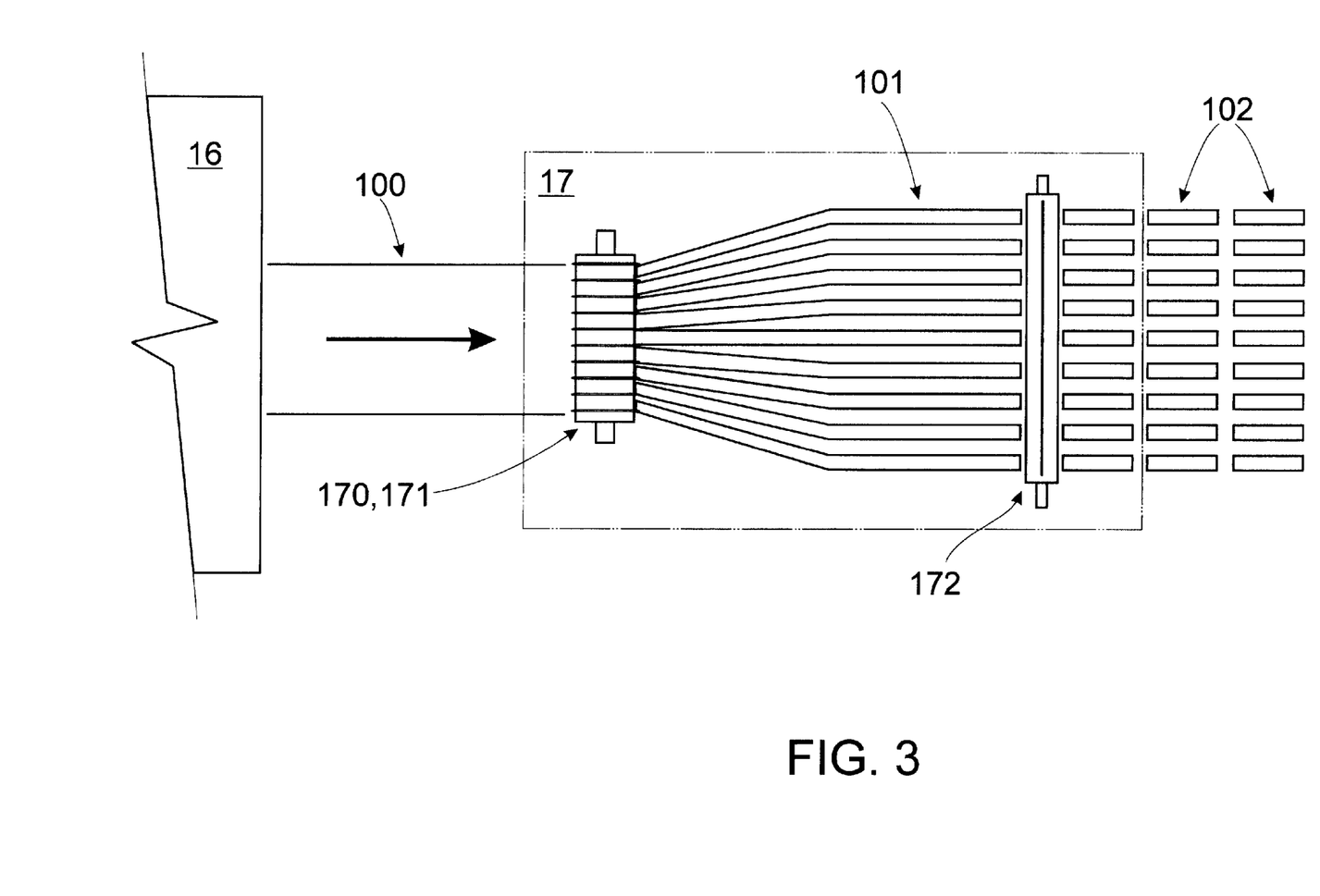
FIG. 3 is a schematic plan view of the cutting machine.

Referring to FIG. 3, the dough 100 is cut into strips 101 by passing the dough between a pair of rollers 170, 171, to be described with reference to FIGS. 4 to 6, and the dough strips 101 are cut into the dough fingers 102 by a rotary cutter 172.

Figure 4:
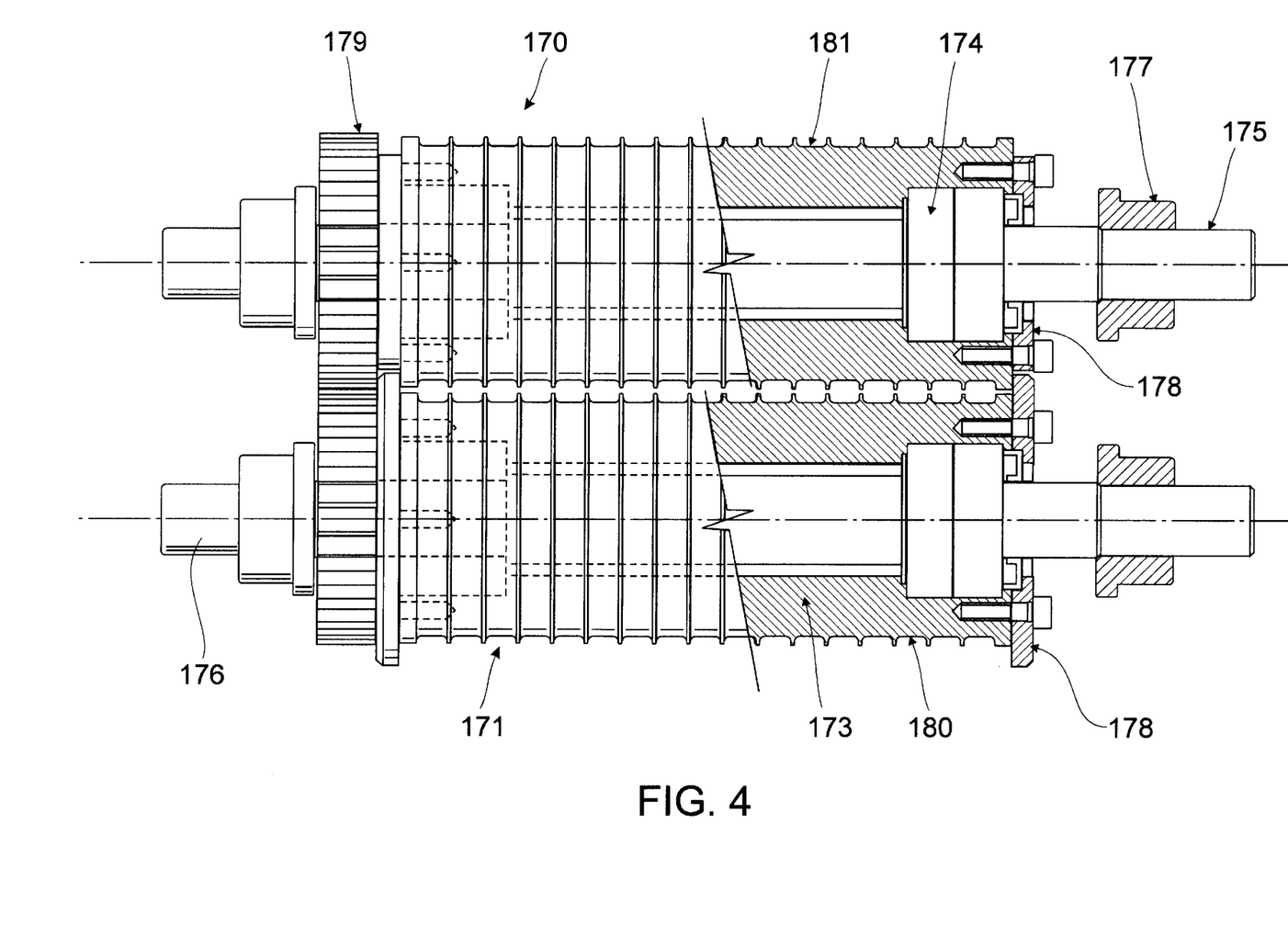
FIG. 4 is a part-sectional plan view of the rollers of the cutting machine.
Figure 5:
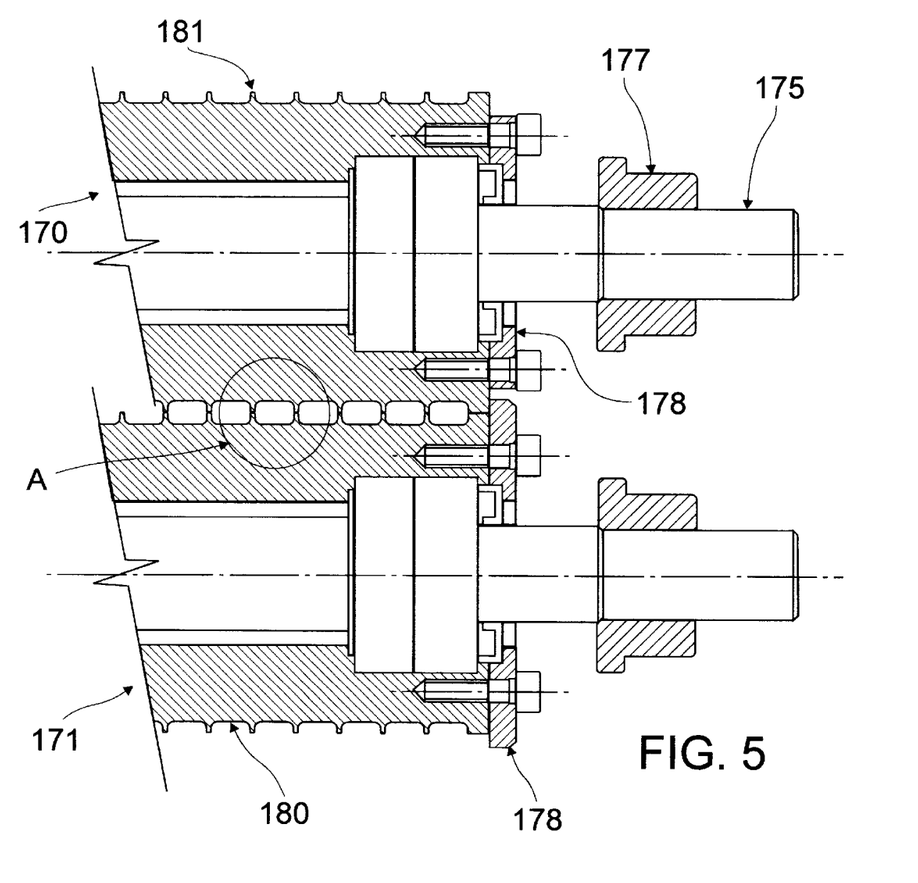
FIG. 5 is a sectional view of one end of the rollers of FIG. 4.
Figure 6:
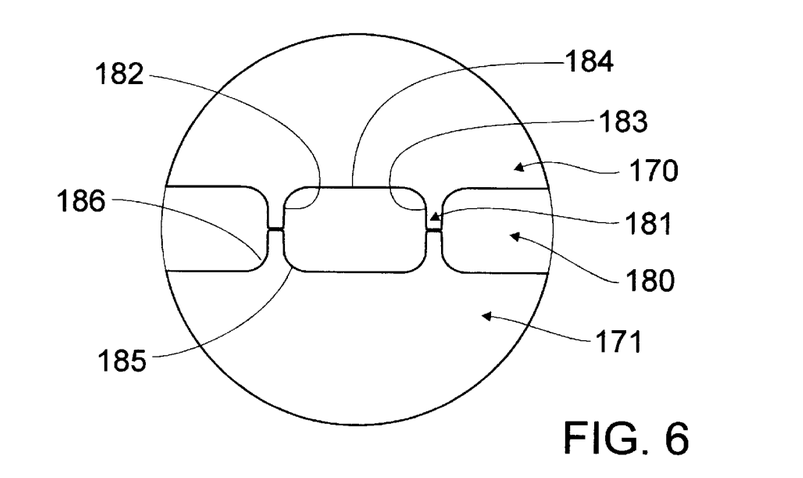
FIG. 6 is an enlarged side view of the detail A in FIG. 5.
Figure 7:
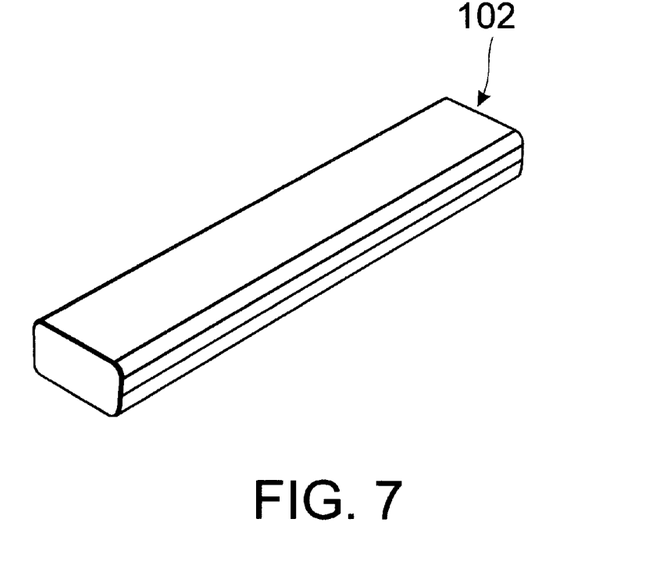
FIGS. 7 and 7A are respective perspective end views of the dough strips cut from the dough sheet.
Figure 7A:
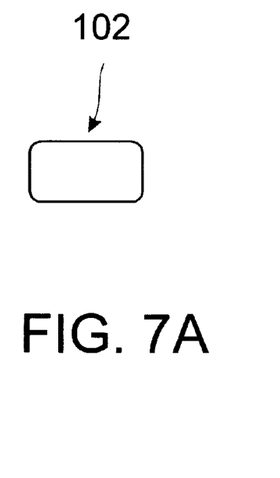

Referring to FIGS. 4 to 6, the rollers 170, 171 are identical and each has a substantially cylindrical body 173 rotatably journalled by bearings 174 on a shaft 175, supported at each end by journals 176, 177 releasably mounted in the cutting machine 17. The rotational axes of the shafts 175 are parallel. Releasable end caps 178 retain the bearings 174 within the roller bodies 173. Drive gears 179 rotatably drive the rollers 170, 171 at identical rotational speeds.

The roller bodies 173 are provided with a plurality of circumferential grooves 180, separated by lands 181, as shown in enlarged scale in FIG. 6.

The adjacent grooves 180 and lands 181 of the rollers 170, 171 are closely aligned and the lack of clearance between the pairs of lands 181 of the rollers 170, 171 ensures that the dough is "pinched" off along the sides of the dough strips 101.

Each groove 180 has substantially planar side walls 182, 183 and a substantially planar floor 184, where the adjacent side walls 182, 183 and the floor 184 are connected by concave shoulders 185, 186.

Figure 8:
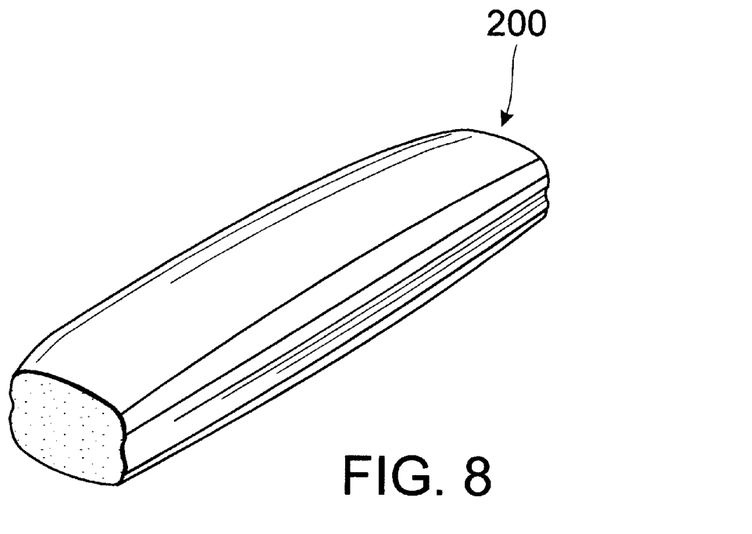
FIGS. 8 and 8A are respective perspective and end views of the final rusk products.
Figure 8A:
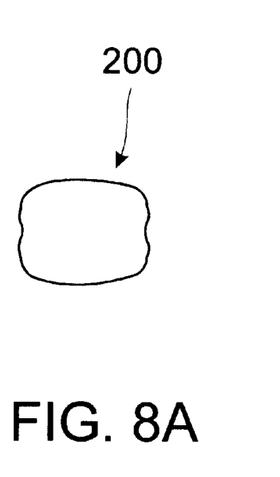

The particular shape of the grooves 180 and the lands 181 is important as it allows the dough fingers 102 to expand as the dough is proved and backed to the final rusk shape shown in FIGS. 8 and 8A, while ensuring the correct texture in the rusks 200 is achieved. This is not possible if the dough strips 101 are cut from a sheet, eg., by conventional circular dough knives co-operating with a support surface.

A spiral mixer 13 may be used to batch mix the flour, yeast and water. An alternative embodiment is the use of a continuous mixer. A continuous mixer will enable the raw materials of flour 10, yeast 11 and water 12 to be metered into the mixer 13 in a continuous stream, and after progressive mixing and development of the dough, will result in a continuous slab of dough being delivered from the mixer 13 to the kneading machine 14 (or "dough sheeting" machine).

An alternative proposal to the forming and cutting machine 17 is the use of an extruded and cutting machine, which will produce continuous cylinders of dough, and then cut the cylinders to the required length of dough.

As hereinbefore described, the yeast 11 is used as a leavening agent to refine the dough structure and enable the dough to be baked as a shaped product. An alternative proposal is to mix a dough without yeast, and by modifying the design of the rolls of the cutting machine 17, and by modifying prover and oven operation produce teething rusks for infants that satisfy the criteria. In this embodiment, a greater volume of dough would be required for each rusk.

The resultant rusks should not shatter when chewed but "cleanly" break into large pieces.

Various changes and modifications may be made to the embodiments described and illustrated without departing from the present invention.

What is claimed is:

1. A food preparation method, suitable for the batch preparation of teething rusks, including the steps of:
   a) mixing ingredients comprising flour, yeast, water to form a dough;
   b) cutting the dough into strips;
   c) proving the dough strips under controlled conditions effective to maintain the strips without splitting and that the carbox dioxide generated by the yeast forms fine, evenly distributed holes within the dough;
   d) baking the dough strips to form respective baked products;
   e) conditioning the baked products under controlled heat and humidity conditions, the heat being in the range of 34 to 37 degree C. and the relative humidity being decreased in a plurality of steps from 90% relative humidity to 65% relative humidity; and
   f) allowing the baked products to cool under controlled humidity conditions to produce baked products with a smooth outer texture.

2. A method as claimed in claim 1, wherein:
   after mixing ingredients to form the dough, the dough is kneaded and formed into an elongate sheet or "mat" from which the strips are to be cut.

3. A method as claimed in claim 2 wherein:
   the dough is 'rested' between the kneading and cutting steps.

4. A method as claimed of claim 1 wherein:
   the baked products are dried and cooled for one to two days prior to packing.

5. A method as claimed in claim 1 wherein:
   the yeast is omitted.

6. A method as claimed in of claim 1 wherein:
   the four is selected from a combination of wheat flour, wheat germ and malt four with an extensibility of 25–30 cm at 45 minutes; a resistance of 40–600 B.U., a water absorption of 60% to 68% and a salt content of less than 1% (w/w).

7. A method as claimed in claim 1 wherein:
   the ingredients are mixed to form a dough for 10 to 16 minutes in a slow/fast/slow cycle to a temperature range of 32° to 38° C.

8. A method as claimed of claim 1 wherein:
   the dough is proved in a prover containing moist steam with a relative humidity of at least 80% for up to 60 minutes.

9. A method as claimed in claim 1 wherein:

the dough is baked in a dry oven for 40 to 50 minutes at 170° C. to 180° C. or in an oven containing steam for 35 to 40 minutes at 120° C. to 130° C.

10. A method as claimed in claim 1 wherein:

the baked products are conditioned at a relative humidity of 80% to 90% at 34° C. to 37° C. for 4–8 hours, at a relative humidity of 70% to 75% at 34° C. to 37° C. for 7–10 hours, and then at a relative humidity of 65% to 70% at 34° C. to 37° C. for 4–6 hours.

11. A method as claimed in claim 1 wherein:

the baked products are cooled at a relative humidity of 45% to 55% at a temperature of 21° C. to 25° C. for 1–2 days.

\* \* \* \* \*

UNITED STATES PATENT AND TRADEMARK OFFICE
CERTIFICATE OF CORRECTION

PATENT NO. : 6,113,956                                                                Page 1 of 1
DATED      : September 5, 2000
INVENTOR(S) : Bower It is certified that error appears in the above-identified patent and that said Letters Patent is hereby corrected as shown below:

<u>Title page,</u>
Item [75], Inventors, "Ronald Bower, Northgate, Australia" should read
-- Ronald Bower, Brisbane, Australia --

<u>Column 4, claim 4,</u>
Line 49, "as claimed of" should read -- as claimed in --

<u>Column 4, claim 6,</u>
Line 54, delete "of" after the word "in"
Line 55, "four" should read -- flour --
Line 56, "four" should read -- flour --

Signed and Sealed this

Ninth Day of April, 2002

Attest:

Attesting Officer

JAMES E. ROGAN
Director of the United States Patent and Trademark Office